(12) United States Patent
Zhao et al.

(10) Patent No.: US 9,591,641 B2
(45) Date of Patent: Mar. 7, 2017

(54) METHOD AND DEVICE FOR SCHEDULING SLOT RESOURCES

(71) Applicant: China Academy of Telecommunications Technology, Beijing (CN)

(72) Inventors: Yi Zhao, Beijing (CN); Yuan Feng, Beijing (CN); Li Zhao, Beijing (CN); Jiayi Fang, Beijing (CN); Feng Li, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 0 days.

(21) Appl. No.: 14/435,435

(22) PCT Filed: Oct. 30, 2013

(86) PCT No.: PCT/CN2013/086262
§ 371 (c)(1),
(2) Date: Apr. 13, 2015

(87) PCT Pub. No.: WO2014/075555
PCT Pub. Date: May 22, 2014

(65) Prior Publication Data
US 2015/0282166 A1    Oct. 1, 2015

(30) Foreign Application Priority Data

Nov. 14, 2012    (CN) .......................... 2012 1 0457388

(51) Int. Cl.
*H04J 3/00*        (2006.01)
*H04W 72/04*   (2009.01)
(Continued)

(52) U.S. Cl.
CPC ......... *H04W 72/0446* (2013.01); *H04L 47/28* (2013.01); *H04W 28/021* (2013.01);
(Continued)

(58) Field of Classification Search
USPC ................ 370/252, 328, 336, 338, 345, 401
See application file for complete search history.

(56) References Cited

U.S. PATENT DOCUMENTS 3,876,838 A * 4/1975 Boxall ................... H04Q 11/04
                                                                        370/434
5,625,626 A * 4/1997 Umekita ........... H04L 12/40013
                                                                        370/448
(Continued)

FOREIGN PATENT DOCUMENTS

CN    101103601 A    1/2008
CN    101459566 A    6/2009
(Continued)

OTHER PUBLICATIONS

The Extended European Search Report issued on Oct. 6, 2015 in the EP counterpart application (13855126.2).
(Continued)

*Primary Examiner* — Ricky Ngo
*Assistant Examiner* — Christine Ng
(74) *Attorney, Agent, or Firm* — Kilpatrick Townsend & Stockton LLP (57) ABSTRACT

This application relates to network management technologies, and disclosed are a method and device for scheduling slot resources. The method is: upon reception of each new data packet delivered by a high level, a first node maintaining corresponding sending remaining time according to a delay requirement of the new data packet; performing slot resource determination on each extracted data packet, starting from the new data packet, in ascending order of the
(Continued)

sending remaining time; when it is determined that the number of data packets to be sent in the sending remaining time corresponding to any data packet is greater than the number of slots currently used by the first node, applying for new slot resources. Therefore, when learning that the slot resources cannot meet the delay requirement of the data packet to be sent, the first node can apply for new slot resources in time, so as to solve the slot resource scheduling problem under the time division resource allocation mechanism based on FI interaction, meet the low-delay requirement on message exchange in telematics, and ensure timely message transmission, thereby effectively ensuring the performance of the telematics.

18 Claims, 4 Drawing Sheets

(51) Int. Cl.
*H04W 72/12* (2009.01)
*H04W 28/02* (2009.01)
*H04L 12/841* (2013.01)

(52) U.S. Cl.
CPC ... *H04W 72/0406* (2013.01); *H04W 72/1221* (2013.01); *H04W 72/1242* (2013.01)

(56) References Cited

U.S. PATENT DOCUMENTS

| | | | |
|---|---|---|---|
| H2103 H * | 5/2004 | Modiano | 370/230 |
| 6,870,807 B1 * | 3/2005 | Chan | H04M 3/4285 370/201 |
| 2002/0024971 A1 * | 2/2002 | Umayabashi | H04J 3/1694 370/468 |
| 2006/0133314 A1 | 6/2006 | Lee et al. | |
| 2007/0097903 A1 * | 5/2007 | Roy | H04W 74/0808 370/328 |
| 2008/0095055 A1 | 4/2008 | Moulsley et al. | |
| 2010/0037487 A1 * | 2/2010 | Connett | A43B 3/24 36/103 |

FOREIGN PATENT DOCUMENTS

| | | |
|---|---|---|
| CN | 100583724 C | 1/2010 |
| CN | 102026292 A | 4/2011 |
| EP | 1562332 A1 | 8/2005 |
| WO | 00/07382 A1 | 2/2000 |

OTHER PUBLICATIONS

H. Agustin Cozzetti et al. Scalability and QoS in MS-Aloha VANETs: Forced Slot Re-Use Versus Pre-Emption. 2011 14th International IEEE Conference on Intelligent Transportation Systems. Oct. 7, 2011.

ETSI TR 102 861 Vi.I.I, Intelligent Transport Systems (ITS); STDMA recommended parameters and settings for cooperative ITS; Access Layer Part. Jan. 31, 2012.

International Search Report and Written Opinion for PCT/CN2013/086262 (both English and Chinese).

Office Action for CN 201210457388.9 issued on Jun. 3, 2015, 5 pages.

* cited by examiner

METHOD AND DEVICE FOR SCHEDULING SLOT RESOURCES

This application is a U.S. National Stage of International Application No. PCT/CN2013/086262, filed on 30 Oct. 2013, designating the United States, and claiming the benefit of Chinese Patent Application No. 201210457388.9, filed with the Chinese Patent Office on Nov. 14, 2012 and entitled "Method and device for scheduling slot resources", which is hereby incorporated by reference in its entirety.

FIELD OF THE INVENTION

The present invention relates to the field of network management and particularly to a method and device for scheduling slot resources.

BACKGROUND OF THE INVENTION

Along with the development of an on-vehicle communication system and the gradual maturation of the technology of mobile ad-hoc networking, the Dedicated Short Range Communication (DSRC) protocol for the car networking has been developed internationally especially for real-time, dynamic and intelligent management of vehicles. With the DSRC protocol, information is transmitted bi-directionally to organically link one vehicle to another and the vehicles to information acquisition devices on a roadside so as to support point-to-point and point-to-multipoint communication.

Figure 1:
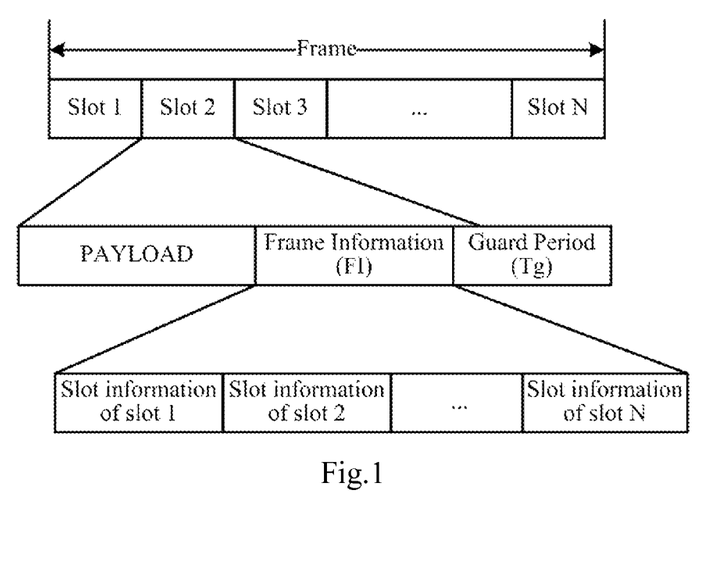
FIG. 1 illustrates a schematic structural diagram of a frame in the prior art.
Figure 2:
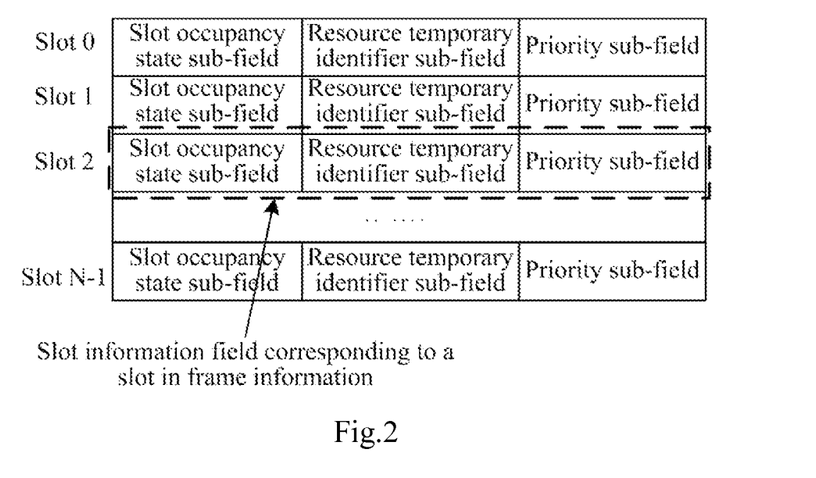
FIG. 2 illustrates a schematic structural diagram of FI in the prior art.

The Mobile Slotted ALOHA (MS-ALOHA) mechanism is a time-division based DSRC Medium Access Control (MAC) layer access and resource allocation mechanism where resources are allocated in a unit of slot based on the frame structure. Referring to FIG. 1, one frame includes N slots numbered 0 to N−1, and these numbers are cyclically repeated from one frame to another. Only one vehicle is allowed to transmit in each slot, that is, there is a Time Division Multiple Access (TDMA) mode between the vehicles. The vehicle transmits both application layer data and Frame Information (FI) in the occupied slot, where occupancy states of respective slots in one frame are indicated in the FI, and FIG. 2 illustrates a possible structure of the FI, for example.

A general idea of the MS-ALOHA mechanism lies in that any node (e.g., a vehicle) accessing the network needs to occupy one slot by monitoring idle slot resources in the frame, and if the node does not give up actively the occupied slot resource, then the node can transmit data in the occupied slot all the time, and the slot will be inaccessible to the other nodes throughout this period of time. The node needs to transmit periodically the FI in the occupied slot, where the FI carries information of conditions of occupying slot, obtained by the node, of the other nodes, within two hops from the node, to indicate occupancy condition information of each slot perceived by the node (also referred to slot state information or slot information), where for each slot, the following information of the slot is indicated: slot occupancy state information, a Source Temporary Identifier (STI) corresponding to a node occupying the slot, referred to as a node identifier, and a priority state of the node occupying the slot (or a priority state corresponding to data transmitted in the slot by the node occupying the slot), where the slot occupancy state information can represent four occupancy states of the slot: (00) represents that the slot is idle, (10) represents that the slot has been occupied by another node at one hop from the current node (simply referred to as a one-hop node) or by the current node, (11) represents that the slot has been occupied by another node at two hops from the current node (simply referred to as a two-hop node), and (01) represents that the slot has been occupied by more than two other nodes, i.e., a collision state; and each node can monitor in a slot, which is not occupied by the node, FI transmitted by an adjacent one-hop node to thereby determine a condition of occupying slot of each adjacent node within a range of three hops, and request a new idle slot again upon detecting that the slot resource occupied by the current node collides with a resource accessed by another node. For the sake of a convenient description later, the FI and the information contents therein will be described as follows throughout this application:

Frame Information (FI) transmitted by a node will be referred to as an FI message or simply FI;

Occupancy condition information corresponding to each slot indicated in the FI will be referred to as a slot information field corresponding to each slot in the FI message; and Three kinds of information indicated in the occupancy condition information corresponding to each slot in the FI (i.e., slot occupancy state, STI and priority information) will be referred to respectively as a slot occupancy state sub-field, a STI sub-field and a priority sub-field included in the slot information field of each slot.

It shall be noted that the FI and the information contents therein have been described above only for the sake of a convenient description later, or of course, they can alternatively be described otherwise.

Figure 3:
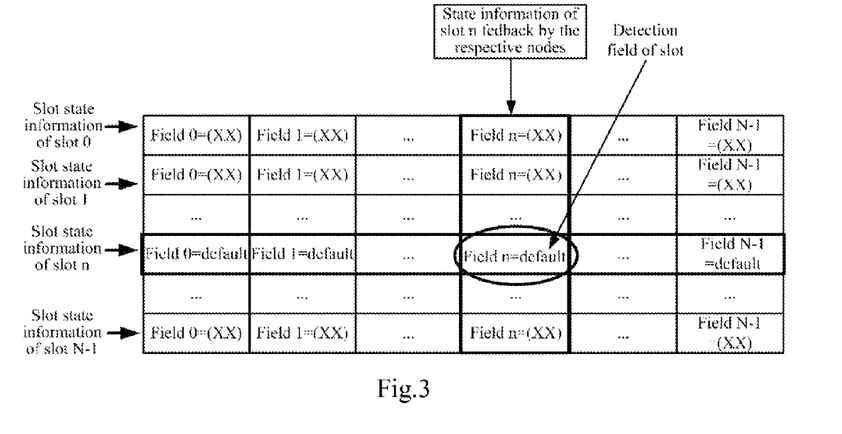
FIG. 3 illustrates a schematic diagram of a slot state buffer table in the prior art and an embodiment of this application.

Under the MS-ALOHA mechanism, the node needs to maintain the occupied slot by maintaining a slot state buffer table with (N−1)*N elements, storing the slot information fields of the respective slots carried in the FI message, transmitted by the adjacent node, received in the corresponding slot. Referring to FIG. 3, for example, there is illustrated an N*N-element slot state buffer table, and since the FI message transmitted by the node in the occupied slot does not need to be stored, the slot state buffer table really maintained by the node includes N−1 rows (on the assumption that each node occupies only one slot), and the (N−1)*N slot state buffer table to be described later in this application will relate to a table in which the slot information of the FI transmitted by the node in the occupied slot is not stored; where a detection field corresponding to a slot refers to a slot information field corresponding to the occupied slot in the FI message transmitted in the slot, referred to as a "detection field" of the slot, and a "non-detection field" refers to a slot information field corresponding to the slot in the FI transmitted in another slot than the occupied slot, referred to as a "non-detection field" of the slot; and a default value is a value by default.

Upon reception of an FI message in a slot, the node always overwrites the information contents in the row, where the corresponding slot is located, in the slot state buffer table (i.e., the contents recorded for the last frame periodicity) with slot information contents carried in the newly received FI message, particularly as follows:

The node generates and transmits an FI message in a slot occupied by the node, where the respective fields, including slot occupancy state sub-fields, STI sub-fields and priority sub-fields, needs to be filled in under some rule. The node will clear the transmitted FI information after transmitting the FI message.

The node needs to receive in a slot which is not occupied by the node an FI message transmitted by an adjacent node, updates the slot state buffer table according to the received FI message, and before the node proceeds to the slot occupied by the current node, judges whether the slot occupied by the node has been maintained successfully, and determines occupancy states of respective slots other than the slot occupied by the node, where if there is no FI received in another slot than the slot occupied by the node, then the node will fill the default value in the respective fields of the row corresponding to the slot in the slot state buffer table. The default value is currently defined as the idle state (00), or of course, the default value can alternatively be defined otherwise.

At present the existing slot resource allocation mechanism based upon the exchanged FI is generally focused on the FI being exchanged so that the respective nodes perceive the slot occupancy states of the adjacent nodes to thereby determine the slot resources which can be requested by the respective nodes. However, in the car networking, there is a strict requirement on a transmission delay of a message in traffic safety and traveling efficiency related applications, for example, the transmission delay of a message is generally required not to exceed 100 ms, but such a required transmission delay in these application may be difficult to accommodate in the traditional cellular network where resources are centrally allocated, for example, if the transmission delay is required to be "a delay of 100 ms from the current time", then the transmitting of the message may tend to be delayed because it is very likely for a traditionally requested slot resource to become accessible after 100 ms.

As well known, an unredeemable aftereffect may occur as a result of a transmission delay of a message in an application with a strict requirement on the transmission delay, so there is a need of redesigning a slot resource scheduling mechanism to accommodate a low delay required in exchanging a message over the car networking.

SUMMARY OF THE INVENTION

Embodiments of the invention provide a method and device for scheduling slot resources so as to ensure real-time transmission of a message over the car networking.

Particular technical solutions according to embodiments of this application are as follows:

A method for scheduling slot resources includes:

storing, by a first node, upon reception of each new data packet transmitted by a higher layer, the new data packet and maintaining a remaining transmission time of the new data packet according to a transmission delay corresponding to the new data packet; and making, by the first node, a judgement on slot resource sequentially for each stored data packet with the remaining transmission time more than or equal to the remaining transmission time of the new data packet in an ascending order of the remaining transmission time starting with the new data packet, requesting a new slot resource when it is determined that the number of data packets to be transmitted is more than the number of slots currently used by the first node in the remaining transmission time corresponding to any data packet.

Preferably maintaining, by the first node, the remaining transmission time of the new data packet according to the transmission delay corresponding to the new data packet includes:

determining, by the first node, the preset transmission delay corresponding to the new data packet upon reception of the new data packet; and setting, by the first node, a timer, associated with the new data packet, for maintaining the remaining transmission time, according to the transmission delay, where the remaining transmission time characterizes the length of time starting from current time to the latest transmission time corresponding to the transmission delay of the new data packet.

Further to any embodiment above of the method, preferably making, by the first node, a judgement on slot resource sequentially for each stored data packet with the remaining transmission time more than or equal to the remaining transmission time of the new data packet in an ascending order of the remaining transmission time starting with the new data packet includes:

sorting, by the first node, the stored data packets in an ascending order or a descending order according to the remaining transmission times corresponding thereto, and then making a judgement on slot resource sequentially for each data packet with the remaining transmission time more than or equal to the remaining transmission time of the new data packet in an ascending order of the remaining transmission time, starting with the new data packet, among the respective sorted data packets; or comparing, by the first node, the remaining transmission time of each stored data packet with the remaining transmission time of the new data packet starting with the new data packet, then picking the data packets with the remaining transmission times more than or equal to the remaining transmission time of the new data packet from the respective stored data packets according to comparison results, and next making a judgement on slot resource sequentially for each picked data packet in an ascending order of the remaining transmission time.

Further to any embodiment above of the method, preferably requesting a new slot resource upon determining that the number of data packets to be transmitted is more than the number of slots currently used by the first node in the remaining transmission time corresponding to the any data packet, in a process of making, by the first node, while making a judgement on slot resource for any data packet, includes:

judging, by the first node, from locally maintained slot state information, whether there are idle slots in the system before the remaining transmission time corresponding to the any data packet expires; and If so, then selecting one of the idle slots as a newly requested slot;

otherwise, discarding the any data packet, and stopping making a judgement on slot resource for a subsequent data packet; or reserving the any data packet, terminating a slot requesting process for the any data packet, and continuing making a judgement on slot resource for a subsequent data packet; or selecting a low-priority data packet, with the remaining transmission time less than that of the any data packet and a priority lower than that of the any data packet, from the stored data packets, and deleting the selected low-priority data packet from a buffer; or when a delay margin corresponding to the any data packet is set and the delay margin is not 0, updating the remaining transmission time corresponding to the any data packet with the length of time indicated by the delay margin, and selecting an idle slot in an updated remaining transmission time as a newly requested slot, wherein if there is still no idle slot in the updated remaining time, the any data packet is discarded, and no judgement on slot resource is made for a subsequent data packet; or the any data packet is reserved, the slot requesting process for the any data packet is terminated, and a judgement on slot resource is further made for a subsequent data packet; or a low-priority data packet, with the remaining transmission time less than that of the any data packet and a priority lower than that of the any data packet, is selected from the stored data packets, and the selected low-priority data packet is deleted from a buffer.

Furthermore after the newly requested slot is selected from the idle slots, the first node may add the newly requested slot to a list of requested slots and update the slot state information corresponding to the newly requested slot.

Further to any embodiment above of the method, preferably each time an accessible slot arrives, the first node selects and transmits a data packet currently with a shortest remaining transmission time, wherein if any data packet is not transmitted successfully when the corresponding remaining transmission time becomes zero, then the first node discards the data packet.

Further to any embodiment above of the method, preferably when any accessible slot arrives, if it is determined that there is currently no data packet to be transmitted, then the first node invalidates the accessible slot, wherein if the accessible slot is a requested slot, then the first node deletes the requested slot from a locally maintained list of requested slots, and if the accessible slot is an occupied slot, then the first node deletes the occupied slot from a locally maintained list of occupied slots.

A device for scheduling slot resources includes:

a communication unit configured, upon reception of each new data packet transmitted by a higher layer, to store the new data packet and to maintain a remaining transmission time of the new data packet according to a transmission delay corresponding to the new data packet; and a scheduling unit configured to make a judgement on slot resource sequentially for each stored data packet with the remaining transmission time more than or equal to the remaining transmission time of the new data packet in an ascending order of the remaining transmission time starting with the new data packet, to request a new slot resource when it is determined that the number of data packets to be transmitted is more than the number of slots currently used by the device in the remaining transmission time corresponding to any data packet.

The device for scheduling slot resources according to the embodiment of the invention is the first node above.

Preferably the communication unit is configured:

to determine the preset transmission delay corresponding to the new data packet upon reception of the new data packet; and to set a timer, associated with the new data packet, for maintaining the remaining transmission time, according to the transmission delay, wherein the remaining transmission time characterizes the length of time starting from current time to the latest transmission time corresponding to the transmission delay of the new data packet.

Further to any embodiment above of the device, preferably the scheduling unit is configured:

to sort the stored data packets in an ascending order or a descending order according to the remaining transmission times corresponding thereto, and then to make a judgement on slot resource sequentially for each stored data packet with the remaining transmission times more than or equal to the remaining transmission time of the new data packet in an ascending order of the remaining transmission time, starting with the new data packet, among the respective sorted data packets; or to compare the remaining transmission time of each stored data packet with the remaining transmission time of the new data packet starting with the new data packet, then to pick the data packets with the remaining transmission times more than or equal to the remaining transmission time of the new data packet from the respective stored data packets according to comparison results, and next to make a judgement on slot resource sequentially for each picked data packet in an ascending order of the remaining transmission time.

Further to any embodiment above of the device, preferably the scheduling unit configured to request the new slot resource when it is determined that the number of data packets to be transmitted is more than the number of slots currently used by the device in the remaining transmission time corresponding to the any data packet while making a judgement on slot resource for any data packet is configured:

to judge from locally maintained slot state information whether there are idle slots in the system before the remaining transmission time corresponding to the any data packet expires; and if so, to select one of the idle slots as a newly requested slot;

otherwise, to discard the any data packet, and to stop making a judgement on slot resource for a subsequent data packet; or to reserve the any data packet, to terminate a slot requesting process for the any data packet, and to continue making a judgement on slot resource for a subsequent data packet; or to select a low-priority data packet, with the remaining transmission time less than that of the any data packet and a priority lower than that of the any data packet, from the stored data packets, and to delete the selected low-priority data packet from a buffer; or when a delay margin corresponding to the any data packet is set and the delay margin is not 0, to update the remaining transmission time corresponding to the any data packet with the length of time indicated by the delay margin, and to select an idle slot in an updated remaining transmission time as a newly requested slot, wherein if there is still no idle slot in the updated remaining time, the any data packet is discarded, and no judgement on slot resource is made for a subsequent data packet; or the any data packet is reserved, the slot requesting process for the any data packet is terminated, and a judgement on slot resource is further made for a subsequent data packet; or a low-priority data packet, with the remaining transmission time less than that of the any data packet and a priority lower than that of the any data packet, is selected from the stored data packets, and the selected low-priority data packet is deleted from a buffer.

Furthermore the communication unit can be further configured:

after the newly requested slot is selected from the idle slots, to add the newly requested slot to a list of requested slots, and to update the slot state information corresponding to the newly requested slot.

Further to any embodiment above of the device, preferably the communication unit is further configured:

each time an accessible slot arrives, to select and transmit a data packet currently with the shortest remaining transmission time, wherein if any data packet is not transmitted successfully when the corresponding remaining transmission time becomes zero, then the data packet is discarded.

Further to any embodiment above of the device, preferably the scheduling unit is further configured:

when any accessible slot arrives, if it is determined that there is currently no data packet to be transmitted, to invalidate the accessible slot, wherein if the accessible slot is a requested slot, then the requested slot is deleted from a locally maintained list of requested slots, and if the accessible slot is an occupied slot, then the occupied slot is deleted from a locally maintained list of occupied slots.

Based upon the same inventive idea as the method, an embodiment of the invention further provides a device, including a processor, for scheduling slot resources (i.e., the first node described in the embodiment of the method), wherein:

the processor is configured, upon reception of each new data packet transmitted by a higher layer, to store the new data packet and to maintain a remaining transmission time of the new data packet according to a transmission delay corresponding to the new data packet; and to make a judgement on slot resource for each stored data packet with the remaining transmission time more than or equal to the remaining transmission time of the new data packet sequentially in an ascending order of the remaining transmission time starting with the new data packet and to request a new slot resource when it is determined that the number of data packets to be transmitted is more than the number of slots currently used by the device in the remaining transmission time corresponding to any data packet.

In the embodiments of the invention, upon reception of each new data packet transmitted by the higher layer, the first node maintains a corresponding remaining transmission time according to a delay requirement of the new data packet, makes a judgement on slot resource for each picked data packet sequentially in an ascending order of the remaining transmission time starting with the new data packet, and requests a new slot resource upon determining that the number of data packets to be transmitted is more than the number of slots currently used by the first node in the remaining transmission time corresponding to any data packet. Thus upon reception of each new data packet, the first node will judge whether the data packets to be transmitted can be carried in the current slot resources on the premise that the current slot resources accommodate the delay requirement of the data packets and thus can request a new slot resource in a timely manner upon determining that the slot resources can not accommodate the delay requirement of the data packets to be transmitted to thereby address the issue of scheduling slot resources in the time-division resource allocation mechanism based upon exchanged FI, to satisfy the requirement of a low delay in exchanging a message over the car networking and to guarantee timely transmission of the message so as to guarantee effectively the performance of the car networking.

DETAILED DESCRIPTION OF THE EMBODIMENTS

In embodiments of this application, a new slot resource scheduling mechanism is designed to utilize slot resource information, obtained by exchanging FI, to satisfy transmission requirements of data packets, with different delay requirements, transmitted by a higher layer (i.e., resources scheduling), particularly as follows: a node allocates corresponding slot resources for the data packets according to remaining transmission times of the respective data packets to thereby satisfy transmission requirements of the data packages, with the different delay requirements.

In the embodiments of this application, respective nodes can maintain FI of respective slots in a frame in the following two approaches:

In a first maintenance approach, FI is stored accumulatively, that is, in a periodicity of the frame, a node receives FI, transmitted by the other nodes, in slots occupied by the respective other nodes, and analyzes the stored FI for slot state information of respective slots, particularly as illustrated in FIG. 3.

Figure 4:
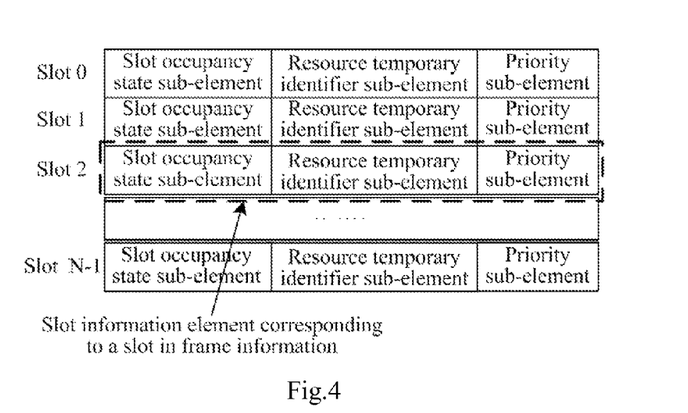
FIG. 4 illustrates a schematic diagram of a slot state vector (table) according to an embodiment of this application.

In a second maintenance approach, FI is stored iteratively, that is, a node stores only a vector about current occupancy states of respective slots, referred to as a slot state vector (also referred to as a slot state table), which will be referred to as a slot state vector (table) below, and FIG. 4 illustrates a possible slot state vector (table); and the node updates, upon reception of FI transmitted by another node, the slot information element corresponding to each slot in the locally stored slot state vector (table), according to slot information fields corresponding to the respective slots in the newly received FI to maintain the slot information by maintaining the slot state vector (table). When the node needs to transmit FI determined by the node, the node will generate the FI to be transmitted from the information in the stored slot state vector (table).

It shall be noted that the description above has been given for the sake of a convenient description later, or of course, the description can alternatively be given otherwise.

Figure 5:
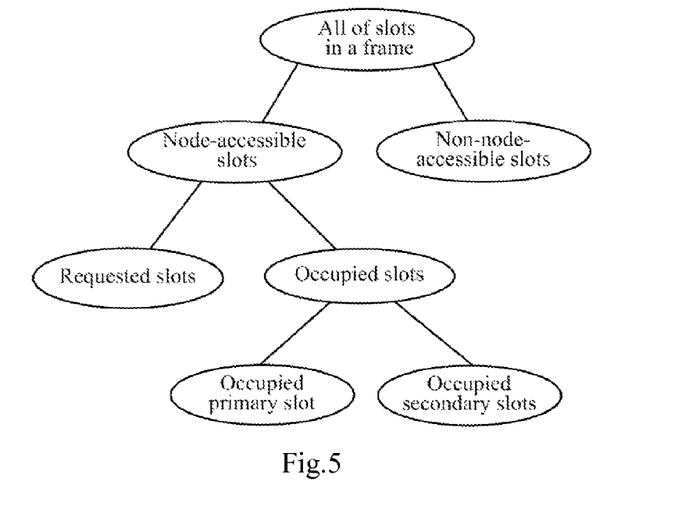
FIG. 5 illustrates a schematic diagram of types of slots according to an embodiment of this application.

In another aspect, in the embodiment of the invention, a node can occupy a plurality of slot resources, and when the node occupies a plurality of slot resources, in order to maintain the plurality of slot resources occupied by the node, the slots related to the node can be categorized as follows (particularly as illustrated in FIG. 5):

1. Occupied slots, where a slot, which is occupied by a node and in which the node transmits FI and/or a data packet successfully will be defined in the embodiment of the invention as an occupied slot of the node.

Particularly the occupied slots of the node can be further categorized as follows:

An occupied primary slot which is a specific slot among the occupied slots of the node. Each node can determine specific one of occupied slots as a primary slot of the node.

Occupied secondary slots which are other occupied slots than the primary slot among the occupied slots.

Of course, the node may alternatively not distinguish the occupied slots from each other as above.

2. Requested slots, where the MAC layer compares the amount of data of higher-layer data packets required to be transmitted in a buffer queue with the transmission capacity available from the occupied slots or accessible slots (including requested slots) of the node, and if the amount of data of the data packets is more than the transmission capacity available from the occupied slots or accessible slots (including the requested slots), then the MAC layer requests a new slot (i.e., a requested slot). The requested slot will be translated into an occupied slot only if the node determines that the requested slot is not occupied by another node when the requested slot arrives.

The slot resources occupied by the node can be further categorized as follows based upon the technical definitions above:

1) Node-accessible slots (also referred to simply as accessible slots), where a slot occupied by the node and a slot being requested by the node will be collectively referred to as a node-accessible slot for the sake of a convenient description later. The node-accessible slots can alternatively include only the slots occupied by the node in some particular scenarios.

2) Non-node-accessible slots which are all the other slots than the node-accessible slots among all the slots in the frame.

Preferred embodiments of this application will be described below in details with reference to the drawings.

In an embodiment of the invention, a higher layer, when transmits data packets to a first node, will associate a corresponding transmission delay requirement with each data packet. Different data packets may correspond to different transmit delays, and upon reception of each data packet, the first node will set a timer according to the delay requirement of the data packet so that the corresponding data packet shall be transmitted before the timer expires, i.e., before the timer arrives at the time corresponding to the maximum delay. The length of time maintained by the timer of each data packet will be decremented as the time progresses constantly. In this embodiment, for any data packet, the length of time from the current time to the latest transmission time corresponding to the transmission delay of the data packet will be referred to a remaining transmission time of the any data packet. Apparently the data packets in a buffer typically correspond to different remaining transmission times, and the timer corresponding to each data packet indicates the remaining transmission time of the corresponding data packet. If a data packet is not transmitted successfully before the corresponding timer expires, then the data packet will be discarded.

In the embodiment of the invention, the latest transmission time corresponding to the transmission delay is the latest transmission time determined from the transmission delay.

In the embodiment of the invention, the higher layer is a protocol layer above a protocol layer by which the slot resource scheduling mechanism is implemented in the first node.

Figure 6:
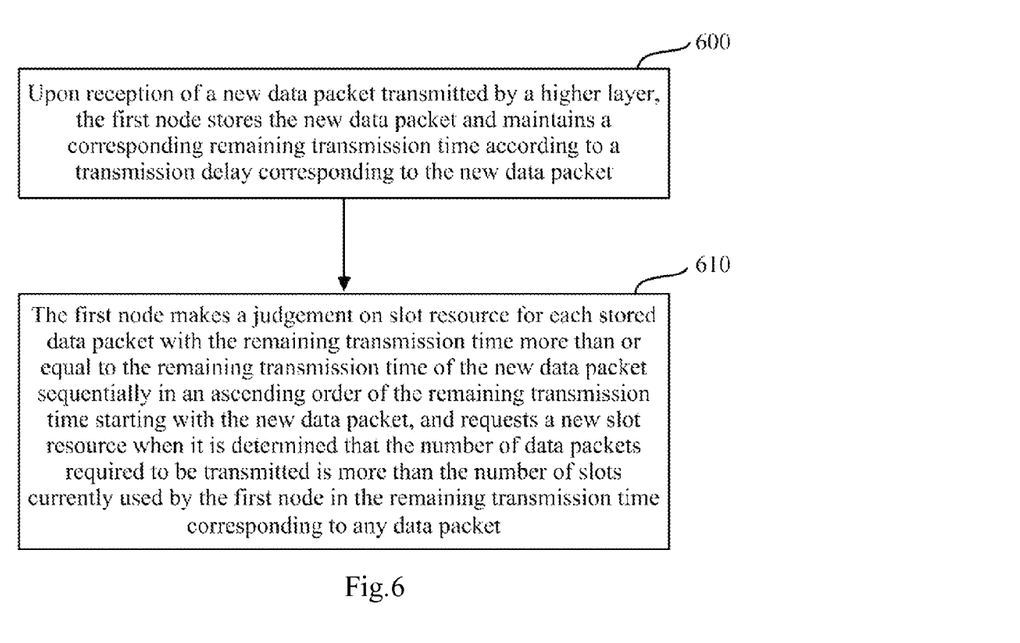
FIG. 6 illustrates a flow chart of a first node scheduling slot resources according to a transmission delay of a data package according to an embodiment of this application.

Referring to FIG. 6, in an embodiment of the invention, a first node allocates slot resources for data packets with different transmission delays in the following detailed flow:

Operation 600: upon reception of a new data packet transmitted by a higher layer, the first node stores the new data packet and maintains a corresponding remaining transmission time according to a transmission delay corresponding to the new data packet.

In the embodiment of the invention, the first node receives the data packets transmitted by the higher layer sequentially in a preset order, and upon reception of a new data packet, the first node stores the new data packet into a local MAC buffer and also sets a timer associated with the new data packet according to the transmission delay corresponding to the new data packet, where the timer maintains the remaining transmission time of the new data packet.

Operation 610: the first node makes a judgement on slot resource for each stored data packet with the remaining transmission time more than or equal to the remaining transmission time of the new data packet sequentially in an ascending order of the remaining transmission time starting with the new data packet, and requests a new slot resource when it is determined that the number of data packets required to be transmitted is more than the number of slots currently used by the first node in the remaining transmission time corresponding to any data packet.

The first node makes judgements on slot resources for all the data packets with the remaining transmission times more than or equal to the remaining transmission time of the new data packet, including the new data packet itself, among the stored data packets.

In the embodiment of the invention, the first node can make judgements on slot resources for the respective data packets in the following two approaches without any limitation thereto:

In a first approach, the first node sorts the stored data packets in an ascending order or a descending order according to the remaining transmission times corresponding thereto and then makes a judgement on slot resource for each data packet in an ascending order of the remaining transmission time sequentially for the respective data packets with the remaining transmission times more than or equal to the remaining transmission time of the new data packet, starting with the new data packet, among the respective sorted data packets.

In a second approach, the first node compares the remaining transmission time of each stored data packet with the remaining transmission time of the new data packet, starting with the new data packet, then picks the respective data packets with the remaining transmission times more than or equal to the remaining transmission time of the new data packet from the respective stored data packets according to comparison results, and next makes a judgement on slot resource for each picked data packet sequentially in an ascending order of the remaining transmission time. That is, when making a judgement on slot resource, the object for which the judgement is made is a data packet, for which no judgement on slot resource has not been made currently, and with the shortest remaining transmission time among the respective picked data packets; and after a judgement on slot resource is made for one picked data packet, the first node will select a next data packet every time under the same rule to make a judgement on slot resource, and so on, although a repeated description thereof will be omitted here.

In the embodiment of the invention, a judgement on slot resource is made for any data packet (referred to below as a data packet X) by the first node judging whether the number of data packets to be transmitted (including the data packet X) is more than the number of current accessible slots of the first node (including occupied slots and requested slots) in the remaining transmission time corresponding to the data packet X, and if so, then it indicates that the data packets to be transmitted can not be carried in the current slot resources, and at this time, the first node shall request new slot resources; otherwise, it indicates that the data packets to be transmitted can be carried in the current slot resources, and the first node can read a next data packet and continues making a judgement on slot resource.

For example, if there are four data packets, referred to respectively as a data packet 1, a data packet 2, a data packet 3 and a data packet 4, stored before the first node receives the data packet X, and there are four accessible slots of the first node, referred to respectively as a slot 1, a slot 2, a slot 3 and a slot 4, where apparently each data packet corresponds to one of the accessible slots, then the first node sorts the respective data packets in an ascending order of the remaining transmission time upon reception of the data packet X, for example, as the data packet 1<the data packet 2<the data packet X<the data packet 3<the data packet 4, so the first node makes judgements on slot resource sequentially in an order of the data packet X->the data packet 3->the data packet 4, particularly as follows:

Firstly the first node determines that there are three data packets to be transmitted, i.e., the data packet 1, the data packet 2 and the data packet X respectively, and the number of slots currently used by the first node is 4, in the remaining transmission time of the data packet X, where 3<4, so apparently the first node does not need to request a new slot resource for the data packet X.

Next the first node further determines that there are four data packets to be transmitted, i.e., the data packet 1, the data packet 2, the data packet X and the data packet 3 respectively, and the number of slots currently sued by the first node is 4, in the remaining transmission time of the data packet 3, where 4=4, so apparently the first node does not need to request a new slot resource for the data packet 3 either.

Finally the first node further determines that there are five data packets to be transmitted, i.e., the data packet 1, the data packet 2, the data packet X, the data packet 3 and the data packet 4 respectively, and the number of slots currently sued by the first node is 4, in the remaining transmission time of the data packet 4, where 5>4, so apparently the first node needs to request a new slot resource for the data packet 4, and of course, the data packet 4 may not be transmitted in the newly requested slot.

Since the first node makes a judgement on slot resource for each picked data packet sequentially in an ascending order of the remaining transmission time starting with the newly received data packet, in fact the first node requests a new slot resource for the transmission of the data packet for which the judgement on slot resource is currently made upon determining that the new slot resource needs to be requested, so the first node needs to refer to the remaining transmission time of the data packet when requesting a new slot resource, in view of a transmission delay of the data packet.

For example, in the embodiment of the invention, when requesting a new slot resource for the picked data packet X, the first node judges, according to locally maintained slot state information (e.g., a locally maintained slot state buffer table or slot state vector, where it shall be noted that the first node can alternatively determine a newly requested slot from slot state information obtained otherwise, e.g., historical slot state information maintained by the first node), whether there are idle slots in the system before the remaining transmission time corresponding to the data packet X expires; and If so, then one of the idle slots is selected randomly as a newly requested slot, where the data packet X may not be transmitted in the newly requested slot, since the newly requested slot is selected randomly; otherwise, the data packet can be processed in the following three approaches: in a first approach, the data packet X is discarded; in a second approach, the data packet X is still reserved in the buffer and the current slot requesting process (i.e., the slot requesting process incurred by making a judgement on slot resource for the data packet X) is terminated; and in a third approach, a low-priority data packet with the remaining transmission time less than that of the data packet X and a priority lower than that of the data packet X is selected from the stored data packets and the selected lower-priority data packet is deleted from the buffer, where preferably when there are a plurality of low-priority data packets with the remaining transmission times less than that of the data packet X and priorities lower than that of the data packet X, a data packet with the shortest remaining transmission time among data packets with the lowest priority is discarded.

It shall be noted that in order to make it more likely for the data packet to be transmitted successfully, the first node may set a delay margin for the data packet X. The time delay refers to, when the first node determines the length of the remaining transmission time of the data packet X from the transmission delay of the data packet X, the length of the remaining time is not determined exactly from the length of the required transmission delay but some delay margin is reserved so that when the data packet X fails to be transmitted in the initially preset remaining transmission time, the length of the remaining transmission time is further updated with the delay margin to thereby make it more likely for the data packet X to be transmitted successfully in the required delay range thereof. Particularly when the different data packets correspond to different priorities, different time margins can be set to thereby ensure success rates of transmitting the data packets with the different priorities.

For example, the delay margin is applied as follows: if the transmission delay of the data packet X is 100 ms, that is, the data packet is required to be transmitted in 100 ms, and the delay margin of the data packet X is determined as 20 ms according to the priority of the data packet (or under another criterion), then at this time the initial length of the timer to maintain the remaining transmission time is equal to 80 ms which is the transmission delay (100 ms) minus the delay margin (20 ms) (it shall be noted that the length of the remaining transmission time is set taking into account only the delay margin, but other margins, e.g., a processing temporal margin of hardware, etc., may be further taken into account in a real system, where the other margin values will also be removed from the length of the timer to maintain the remaining transmission time, for example, the processing temporal margin of hardware of 5 ms will be taken into account in addition to the delay margin of 20 ms, so that the remaining transmission time here will be 75 ms). If no idle slots are detected when a new slot resource needs to be requested in the remaining transmission time (80 ms) of the data packet X, and at this time the delay margin of the data packet X is not 0 (but 20 ms), then the first node updates the remaining transmission time with the delay margin to 100 ms (here the delay margin is added to the remaining transmission time, and then the delay margin is set to be 0), and then a new slot resource is requested in the range of the updated remaining transmission time. The delay margin of the data packet can be set at one (that is, all the delay margin is released at one time) or more (that is, the delay margin is released for more than one time) level, and since setting of the delay margin is not a focus of the invention, a detailed description thereof will be omitted here.

Based upon the analysis above, when the delay margin is set for the data packet X and the corresponding delay margin is not 0, if a new slot resource needs to be requested, but there are no idle slots, in the remaining transmission time of the data packet X, then the first node can process the data packet as follows in addition to the three processing approaches above: the remaining transmission time corresponding to the data packet X is updated with the length of time indicated by the delay margin, and an idle slot is selected in the updated remaining transmission time as a newly requested slot, where if there are still no idle slots in the updated remaining transmission time, then the data packet X is discarded and no judgement on slot resource is made for a subsequent data packet, or the data packet X is reserved, the time slot requesting process for the data packet X is terminated and a judgement on slot resource is further made for a subsequent data packet, or a low-priority data packet with the remaining transmission time less than that of the data packet X and a priority lower than that of the data packet X is selected from the stored data packets and the selected lower-priority data packet is deleted from the buffer, and preferably when there are a plurality of low-priority data packets with the remaining transmission times less than that of the data packet X and priorities lower than that of the data packet X, a data packet with the shortest remaining transmission time among data packets with the lowest priority is discarded.

As described above, the latest transmission time corresponding to the transmission delay is the latest transmission time determined from the transmission delay. Given the transmission delay of 100 ms, if no delay margin is set, then the latest transmission time corresponding to the transmission delay is the time which is 100 ms after the current time. If the delay margin is set, then the latest transmission time corresponding to the transmission delay is some time which is less than 100 ms after the current time.

A new slot resource can be requested as above for any data packet for which a judgement is made, so a repeated description thereof will be omitted here. On the other hand, after the newly requested slot is selected from the idle slots, the first node needs to add the newly requested slot to a list of requested slots and to update the slot state information corresponding to the newly requested slot.

Preferably in the process in which a judgement on slot resource is made for any data packet (again referred to as a data packet X below), when the first node determines that the number of data packets to be transmitted is more than the number of slots currently used by the current device in the remaining transmission time corresponding to the data packet X, a new slot resource needs to be requested, and while a new slot resource is being requested, when there is no idle slots in the system before the remaining transmission time corresponding to the data packet X expires, if the first node processes the data packet in the first processing approach (where the data packet X is discarded), then no judgement on slot resource is made for a subsequent data packet, because the first node makes judgements on slot resources upon reception of each new data packet, and if the first node requests a new slot resource after making a judgement on slot resource for the data packet X, then the number of slot resources currently accessible to the first node is sure to be able to accommodate the transmission demand of the currently received data packet, and if no new slot becomes accessible as requested, then since the data packet X has been discarded, the number of slot resources currently accessible to the first node can also accommodate the transmission demand of the currently received data packet, so the first node may not further make a judgement on slot resource for a subsequent data packet in order to save an effort of calculation.

On the other hand, as the time progresses, each time an accessible slot (including an occupied slot and a requested slot) of the first node arrives (where there is no collision occurring), the first node selects from the transmission buffer and transmits a data packet with the shortest remaining transmission time allowed by the delay, where if any data packet is not transmitted successfully when the corresponding remaining transmission time becomes zero (that is, the timer expires), then the first node will discard the data packet.

Moreover when any accessible slot arrives, if the first node determines that there is currently no data packet to be transmitted, then the accessible slot is invalidated, where if the accessible slot is a requested slot, then the first node deletes the requested slot from a locally maintained list of requested slots, and if the accessible slot is an occupied slot, then the first node deletes the occupied slot from a locally maintained list of occupied slots.

The embodiment above will be described below in further details with reference to several particular application scenarios thereof.

Figure 7:
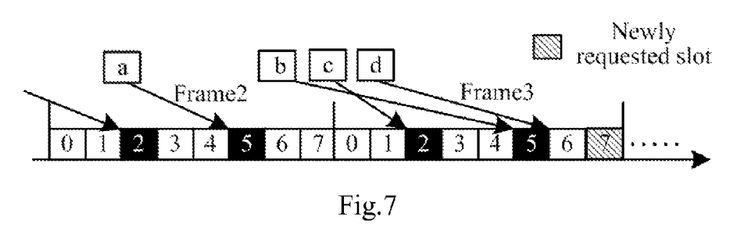
FIG. 7 and FIG. 8 illustrate schematic diagrams of two examples of scheduling slot resources according to an embodiment of this application.

In a first application scenario, higher-layer data packets arrive at a transmit buffer of the node A, and the data packets are transmitted when slot resources arrive.

Referring to FIG. 7, for example, in this embodiment, there are eight slots in a frame, the node A will receive two data packets from the higher layer in each frame periodicity previous to the frame 2, and the node A occupies two slots which are the slot 2 and the slot 5 in a frame periodicity.

Then the node A schedules the slot resources particularly as follows:

1) The node A receives a data packet b in the slot 6 in the frame 2, where a required delay of the data packet b is 8 ms. The node A sets a timer for the data packet b to maintain a remaining transmission time, where the length of time maintained by the timer is equal to the transmission delay of the data packet b, i.e., 8 ms. Then the node A stores the data packet b into the transmit buffer and sorts the data packets in the transmit buffer in an ascending order according to the remaining transmission times corresponding to the data packets in the transmit buffer.

Since at this time there is only the data packet b in the transmit buffer, the data packet b is ranked firstly in the buffer queue. Since the number "1" of data packets in the transmit buffer is less than the number "2" of slots used by the node A in the remaining transmission time corresponding to the data packet b, the node A does not need to request a new slot resource.

2) The node A receives a data packet c in the slot 7 in the frame 2, where a required delay of the data packet c is 6 ms. The node A sets a timer for the data packet c to maintain a remaining transmission time, where the length of time maintained by the timer is equal to the transmission delay of the data packet c, i.e., 6 ms. Then the node A stores the data packet c into the transmit buffer and sorts the data packets in the transmit buffer in an ascending order according to the remaining transmission times corresponding to the data packets in the transmit buffer.

Since at this time the data packet b has been in the transmit buffer, but the remaining transmission time of the data packet c is less than that of the data packet b (the remaining transmission time of the data packet b now has been updated to 7 ms), the data packet c will be ranked before the data packet b in the transmit buffer. Then the node A judges starting with the data packet c whether the number of data packets to be transmitted is more than the number of slot resources currently used by the node A (including occupied slots and requested slots) in the current remaining transmission time indicated by the timer corresponding to the data packet c, and since there is only the data packet c which is the data packet to be transmitted in the remaining transmission time of the data packet c, and there are two occupied slots in the remaining transmission time thereof, it is determined that no new slot needs to be requested; and next the judgment is made for the data packet b, and since there are the data packet c and the data packet b which are data packets to be transmitted in the remaining transmission time of the data packet b, and there are two occupied slots in the remaining transmission time thereof, the node A determines that no new slot needs to be requested.

3) The node A receives a data packet d in the slot 1 in the frame 3, where a required delay of the data packet d is 8 ms. The node A sets a timer for the data packet d to maintain a remaining transmission time, where the length of time maintained by the timer is equal to the transmission delay of the data packet d, i.e., 8 ms. Then the node A stores the data packet d into the transmit buffer and sorts the data packets in the transmit buffer in an ascending order according to the remaining transmission times corresponding to the data packets in the transmit buffer.

Since at this time the data packet c and the data packet b have been in the transmit buffer, and the current remaining transmission times of the data packet c and the data packet b are 5 ms and 6 ms respectively, the data packet d will be ranked lastly in the transmit buffer. Then the node A judges starting with the data packet d whether the number of data packets to be transmitted is more than the number of slot resources currently used by the node A (including occupied slots and requested slots) in the current remaining transmission time indicated by the timer corresponding to the data packet d, and since there are the data packet c, the data packet b and the data packet d which are data packets to be transmitted in the remaining transmission time of the data packet d, and there are only two occupied slots in the remaining transmission time thereof, the node A determines that a new slot needs to be requested.

4) The node A searches a locally maintained slot state vector (table) (where the node A maintains the slot state information in a one-dimension manner, for example, in the embodiment of this application), where occupancy states of the respective slots in the slot state vector (table) are defined as follows: 10 represents that it is occupied by a one-hop node; 11 represents that it is occupied by a two-hop node; 01 represents a colliding slot; and 00 represents it is an idle slot or occupied by a three-hop node. Then the node A maintains the slot state vector (table) as depicted in Table 1 for the slot 1 in the frame 3:

TABLE 1

| Slot 0 | Slot 1 | Slot 2 | Slot 3 | Slot 4 | Slot 5 | Slot 6 | Slot 7 |
|--------|--------|--------|--------|--------|--------|--------|--------|
| 00 | 00 | a: 10 | 00 | b: 10 | a: 10 | 00 | 00 |

There are five idle slots (the slot 0, the slot 1, the slot 3, the slot 6 and the slot 7) in the remaining transmission time (8 ms) of the data packet d, so the node A selects the slot 6 randomly from the idle slots as a newly requested slot of the node A and adds the slot 6 to the list of requested slots of the node A.

5) When the slot 2 of the frame 3 arrives, if at this time the slot 2 is still an occupied slot of the node A (that is, no collision has been indicated previously for the slot 2), then the node A selects and transmits the data packet c with the shortest remaining transmission time in the transmit buffer (i.e., the data packet ranked firstly in the transmit buffer queue).

6) When the slot 5 of the frame 3 arrives, if at this time the slot 5 is still an occupied slot of the node A (that is, no collision has been indicated previously for the slot 5), then the node A selects and transmits the data packet b with the shortest remaining transmission time in the transmit buffer (i.e., the data packet ranked firstly in the transmit buffer queue).

7) When the slot 7 in the frame 3 arrives, if at this time the requested slot 7 of the node A is still idle, then the slot 7 is translated into an occupied slot, and the slot 7 is deleted from the list of requested slots of the node A and also added to the list of occupied slots, and then the node A selects the data packet c with the shortest remaining transmission time in the transmit buffer (i.e., the data packet ranked firstly in the transmit buffer queue) and transmits the data packet c in the slot 7, and at this time the node A maintains the slot state vector (table) as depicted in Table 2:

TABLE 2

| Slot 0 | Slot 1 | Slot 2 | Slot 3 | Slot 4 | Slot 5 | Slot 6 | Slot 7 |
|--------|--------|--------|--------|--------|--------|--------|--------|
| 00 | 00 | a: 10 | 00 | b: 10 | a: 10 | 00 | a: 10 |

In the application scenario above, it shall be noted that the node A will start a collision handling process upon determining from received FI transmitted by another node that there is collision occurring with slots used by the node A (including an occupied slot and a requested slot), but the collision handling process is not a focus in the description of the embodiment of this application.

Figure 8:
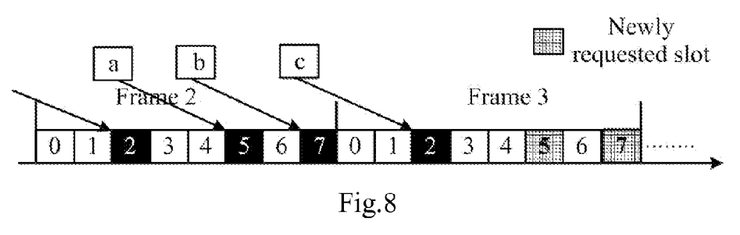

In a second application scenario, the node A receives no higher-layer data packets and then invalidates corresponding slot resources.

Referring to FIG. 8, for example, in this embodiment, there are eight slots in a frame, the node A will receive three data packets from the higher layer in each frame periodicity previous to the frame 2, and the node A occupies three slots which are the slot 2, the slot 5 and the slot 7 in a frame periodicity. The node A maintains the slot state vector (table) as depicted in Table 3:

TABLE 3

| Slot 0 | Slot 1 | Slot 2 | Slot 3 | Slot 4 | Slot 5 | Slot 6 | Slot 7 |
|--------|--------|--------|--------|--------|--------|--------|--------|
| 00 | 00 | a: 10 | 00 | b: 10 | a: 10 | 00 | a: 10 |

Then the node A invalidates the slot resources particularly as follows:

1) The node A receives a data packet c in the slot 6 in the frame 2, where a required delay of the data packet c is 8 ms. The node A sets a timer for the data packet c to maintain a remaining transmission time, where the length of time maintained by the timer is equal to the transmission delay of the data packet c, i.e., 8 ms. Then the node A stores the data packet c into the transmit buffer and sorts the data packets in the transmit buffer in an ascending order according to the remaining transmission times corresponding to the data packets in the transmit buffer.

Since at this time there is only the data packet c in the transmit buffer, the data packet c is ranked firstly in the buffer queue. Since the number "1" of data packets in the current transmit buffer is less than the number "3" of slots used by the node A in the remaining transmission time corresponding to the data packet c, the node A does not need to request a new slot resource.

2) When the slot 2 of the frame 3 arrives, if at this time the slot 2 is still an occupied slot of the node A (that is, no collision has been indicated previously for the slot 2), then the node A selects and transmits the data packet c with the shortest remaining transmission time in the transmit buffer (i.e., the data packet ranked firstly in the transmit buffer queue).

3) When the slot 5 of the frame 3 arrives, if at this time the slot 5 is still an occupied slot of the node A (that is, no collision has been indicated previously for the slot 5), then since at this time there is no data packet in the transmit buffer of the node A, the node A invalidates the slot 5, that is, deletes the slot 5 from the list of occupied slots of the node A. At this time the node A updates the maintained slot state vector (table) as depicted in Table 4:

TABLE 4

| Slot 0 | Slot 1 | Slot 2 | Slot 3 | Slot 4 | Slot 5 | Slot 6 | Slot 7 |
|---|---|---|---|---|---|---|---|
| 00 | 00 | a: 10 | 00 | b: 10 | 00 | 00 | a: 10 |

4) When the slot 7 of the frame 3 arrives, if at this time the slot 7 is still an occupied slot of the node A (that is, no collision has been indicated previously for the slot 7), then since at this time there is no data packet in the transmit buffer of the node A, the node A invalidates the slot 7, that is, deletes the slot 7 from the list of occupied slots of the node A. At this time the node A updates the maintained slot state vector (table) as depicted in Table 5:

TABLE 5

| Slot 0 | Slot 1 | Slot 2 | Slot 3 | Slot 4 | Slot 5 | Slot 6 | Slot 7 |
|---|---|---|---|---|---|---|---|
| 00 | 00 | a: 10 | 00 | b: 10 | 00 | 00 | 00 |

Figure 9:
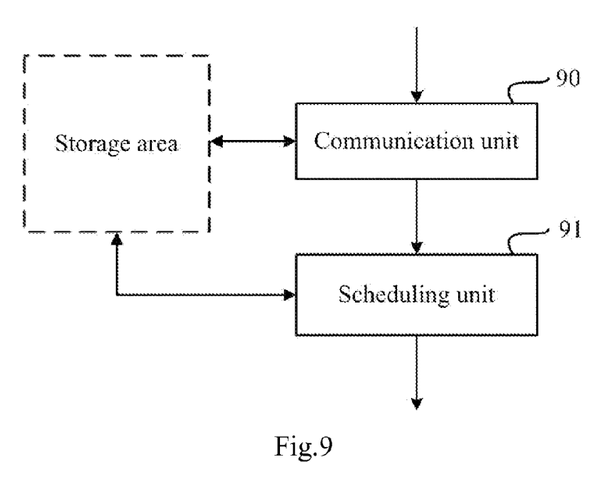
FIG. 9 illustrates a schematic diagram of functional structure of a first node according to an embodiment of this application.

Based upon the embodiment above, referring to FIG. 9, the first node in the embodiment of this application includes a communication unit 90 and a scheduling unit 91, where:

The communication unit 90 is configured, upon reception of each new data packet transmitted by a higher layer, to store the new data packet and to maintain a remaining transmission time of the new data packet according to a transmission delay corresponding to the new data packet; and The scheduling unit 91 is configured to make a judgement on slot resource for each stored data packet with the remaining transmission time more than or equal to the remaining transmission time of the new data packet sequentially in an ascending order of the remaining transmission time starting with the new data packet and to request a new slot resource when it is determined that the number of data packets to be transmitted is more than the number of slots currently used by the current device in the remaining transmission time corresponding to any data packet.

Preferably the communication unit 90 is configured:

To determine the preset transmission delay corresponding to the new data packet upon reception of the new data packet; and To set a timer, associated with the new data packet, for maintaining the remaining transmission time, according to the transmission delay, where the remaining transmission time characterizes the length of time starting from the current time to the latest transmission time corresponding to the transmission delay of the new data packet.

Further to any embodiment above of the first node, preferably the scheduling unit 91 is configured:

To sort the stored data packets in an ascending order or a descending order according to the remaining transmission times corresponding thereto, and then to make a judgement on slot resource for each data packet sequentially in an ascending order of the remaining transmission time for the stored data packets with the remaining transmission times more than or equal to the remaining transmission time of the new data packet, starting with the new data packet, among the respective sorted data packets; or To compare the remaining transmission time of each stored data packet with the remaining transmission time of the new data packet starting with the new data packet, then to pick the data packets with the remaining transmission times more than or equal to the remaining transmission time of the new data packet from the respective stored data packets according to comparison results, and next to make a judgement on slot resource for each picked data packet sequentially in an ascending order of the remaining transmission time.

Further to any embodiment above of the first node, preferably the scheduling unit 91 configured to request a new slot resource upon determining that the number of data packets to be transmitted is more than the number of slots currently used by the first node in the remaining transmission time corresponding to the any data packet while making a judgement on slot resource for any data packet by is configured:

To judge, from locally maintained slot state information, whether there are idle slots in the system before the remaining transmission time corresponding to the data packet, for which the judgement on slot resource is made, expires; and If so, to select one of the idle slots as a newly requested slot;

Otherwise, to discard the data packet for which the judgement on slot resource is made, and to stop making a judgement on slot resource for a subsequent data packet; or To reserve the data packet for which the judgement on slot resource is made, to terminate the slot requesting process for the data packet for which the judgement on slot resource is made, and to continue making a judgement on slot resource for a subsequent data packet; or To select a low-priority data packet, with the remaining transmission time less than that of the data packet for which the judgement on slot resource is made and a priority lower than that of the data packet for which the judgement on slot resource is made, from the stored data packets, and to delete the selected low-priority data packet from a buffer; or When a delay margin corresponding to the data packet for which the judgement on slot resource is made is set and the delay margin is not 0, to update the remaining transmission time corresponding to the data packet, with the length of time indicated by the delay margin, and to select an idle slot in the updated remaining transmission time as a newly requested slot, where if there is still no idle slot in the updated remaining transmission time, the data packet, for which the judgement on slot resource is made, is discarded, and no judgement on slot resource is made for a subsequent data packet; or the data packet, for which the judgement on slot resource is made, is reserved, the slot requesting process for the data packet, for which the judgement on slot resource is made, is terminated, and a judgement on slot resource is further made for a subsequent data packet; or a low-priority data packet, with the remaining transmission time less than that of the data packet for which the judgement on slot resource is made and a priority lower than that of the data packet for which the judgement on slot resource is made, is selected from the stored data packets, and the selected low-priority data packet is deleted from a buffer.

Further to this, the communication unit 90 can be further configured:

After the newly requested slot is selected from the idle slots, to add the newly requested slot to a list of requested slots, and to update the slot state information corresponding to the newly requested slot.

Further to any embodiment above of the first node, preferably the communication unit 90 is further configured:

Each time an accessible slot arrives, to select and transmit a data packet currently with the shortest remaining transmission time, where if any data packet is not transmitted successfully when the corresponding remaining transmission time becomes zero, then the data packet will be discarded.

Further to any embodiment above of the first node, preferably the scheduling unit 91 is further configured:

When any accessible slot arrives, if it is determined that there is currently no data packet to be transmitted, to invalidate the accessible slot, where if the accessible slot is a requested slot, then the requested slot is deleted from a locally maintained list of requested slots, and if the accessible slot is an occupied slot, then the occupied slot is deleted from a locally maintained list of occupied slots.

Based upon the same inventive idea as the method, an embodiment of the invention further provides a device for scheduling slot resources (i.e., the first node described in the embodiment of the method), which includes a processor, where:

The processor is configured, upon reception of each new data packet transmitted by a higher layer, to store the new data packet and to maintain a remaining transmission time of the new data packet according to a transmission delay corresponding to the new data packet; and to make a judgement on slot resource for each stored data packet with the remaining transmission time more than or equal to the remaining transmission time of the new data packet sequentially in an ascending order of the remaining transmission time starting with the new data packet and to request a new slot resource when it is determined that the number of data packets to be transmitted is more than the number of slots currently used by the device in the remaining transmission time corresponding to any data packet.

The device for scheduling slot resources according to the embodiment of the invention can be an on-vehicle device, an information acquisition device on a roadside or another node in the car networking.

In summary, in the embodiments of the invention, upon reception of each new data packet transmitted by the higher layer, the first node maintains a corresponding remaining transmission time according to a delay requirement of the new data packet, makes a judgement on slot resource for each picked data packet sequentially in an ascending order of the remaining transmission time starting with the new data packet, and requests a new slot resource upon determining that the number of data packets to be transmitted is more than the number of slots currently used by the first node in the remaining transmission time corresponding to any data packet. Thus upon reception of each new data packet, the first node will judge whether the data packets to be transmitted can be carried in the current slot resources on the premise that the current slot resources accommodate the required delays of the data packets and thus can request a new slot resource in a timely manner upon determining that the slot resources can not accommodate the required delays of the data packets to be transmitted to thereby address the issue of scheduling slot resources in the time-division resource allocation mechanism based upon exchanged FI, to satisfy the requirement of a low delay in exchanging a message over the car networking and to guarantee timely transmission of the message so as to guarantee effectively the performance of the car networking.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for scheduling slot resources, comprising:
storing, by a first node, upon reception of each new data packet transmitted by a higher layer, the new data packet and maintaining a remaining transmission time of the new data packet according to a transmission delay corresponding to the new data packet; and making, by the first node, a judgement on slot resource sequentially for each stored data packet with the remaining transmission time more than or equal to the remaining transmission time of the new data packet in an ascending order of the remaining transmission time starting with the new data packet, requesting a new slot resource when it is determined that the number of data packets to be transmitted is more than the number of slots currently used by the first node in the remaining transmission time corresponding to any data packet;

wherein requesting a new slot resource upon determining that the number of data packets to be transmitted is more than the number of slots currently used by the first node in the remaining transmission time corresponding to the any data packet, in a process of making, by the first node, a judgement on slot resource for any data packet, comprises:

judging, by the first node, from locally maintained slot state information, whether there are idle slots in the system before the remaining transmission time corresponding to the data packet, for which a judgement on slot resource is made, expires; and If so, then selecting one of the idle slots as a newly requested slot;

otherwise, discarding the data packet for which the judgement on slot resource is made, and stopping making a judgement on slot resource for a subsequent data packet; or reserving the data packet for which the judgement on slot resource is made, terminating a slot requesting process for the data packet for which the judgement on slot resource is made, and continuing making a judgement on slot resource for a subsequent data packet; or selecting a low-priority data packet, with the remaining transmission time less than that of the data packet for which the judgement on slot resource is made and a priority lower than that of the data packet for which the judgement on slot resource is made, from the stored data packets, and deleting the selected low-priority data packet from a buffer; or when a delay margin corresponding to the data packet for which the judgement on slot resource is made is set and the delay margin is not 0, updating the remaining transmission time corresponding to the data packet, for which the judgement on slot resource is made, with the length of time indicated by the delay margin, and selecting an idle slot in an updated remaining transmission time as a newly requested slot, wherein if there is still no idle slot in the updated remaining time, the data packet, for which the judgement on slot resource is made, is discarded, and no judgement on slot resource is made for a subsequent data packet; or the data packet, for which the judgement on slot resource is made, is reserved, the slot requesting process for the data packet, for which the judgement on slot resource is made, is terminated, and a judgement on slot resource is further made for a subsequent data packet; or a low-priority data packet, with the remaining transmission time less than that of the data packet for which the judgement on slot resource is made and a priority lower than that of the data packet for which the judgement on slot resource is made, is selected from the stored data packets, and the selected low-priority data packet is deleted from a buffer.

2. The method according to claim 1, wherein maintaining, by the first node, the remaining transmission time of the new data packet according to the transmission delay corresponding to the new data packet comprises:

determining, by the first node, the preset transmission delay corresponding to the new data packet upon reception of the new data packet; and setting, by the first node, a timer associated with the new data packet, for maintaining the remaining transmission time, according to the transmission delay, wherein the remaining transmission time characterizes the length of time starting from current time to the latest transmission time corresponding to the transmission delay of the new data packet.

3. The method according to claim 2, wherein each time an accessible slot arrives, the first node selects and transmits a data packet currently with a shortest remaining transmission time, wherein if any data packet is not transmitted successfully when the corresponding remaining transmission time becomes zero, then the first node discards the data packet.

4. The method according to claim 2, wherein when any accessible slot arrives, if it is determined that there is currently no data packet to be transmitted, then the first node invalidates the accessible slot, wherein if the accessible slot is a requested slot, then the first node deletes the requested slot from a locally maintained list of requested slots, and if the accessible slot is an occupied slot, then the first node deletes the occupied slot from a locally maintained list of occupied slots.

5. The method according to claim 1, wherein making, by the first node, a judgement on slot resource sequentially for each stored data packet with the remaining transmission time more than or equal to the remaining transmission time of the new data packet in an ascending order of the remaining transmission time starting with the new data packet comprises:

sorting, by the first node, the stored data packets in an ascending order or a descending order according to the remaining transmission times corresponding thereto, and then making a judgement on slot resource sequentially for each data packet with the remaining transmission time more than or equal to the remaining transmission time of the new data packet in an ascending order of the remaining transmission time, starting with the new data packet, among the respective sorted data packets; or comparing, by the first node, the remaining transmission time of each stored data packet with the remaining transmission time of the new data packet starting with the new data packet, then picking the data packets with the remaining transmission times more than or equal to the remaining transmission time of the new data packet from the respective stored data packets according to comparison results, and next make a judgement on slot resource sequentially for each picked data packet in an ascending order of the remaining transmission time.

6. The method according to claim 5, wherein each time an accessible slot arrives, the first node selects and transmits a data packet currently with a shortest remaining transmission time, wherein if any data packet is not transmitted successfully when the corresponding remaining transmission time becomes zero, then the first node discards the data packet.

7. The method according to claim 5, wherein when any accessible slot arrives, if it is determined that there is currently no data packet to be transmitted, then the first node invalidates the accessible slot, wherein if the accessible slot is a requested slot, then the first node deletes the requested slot from a locally maintained list of requested slots, and if the accessible slot is an occupied slot, then the first node deletes the occupied slot from a locally maintained list of occupied slots.

8. The method according to claim 1, wherein after the newly requested slot is selected from the idle slots, the first node adds the newly requested slot to a list of requested slots, and updates the slot state information corresponding to the newly requested slot.

9. The method according to claim 1, wherein each time an accessible slot arrives, the first node selects and transmits a data packet currently with a shortest remaining transmission time, wherein if any data packet is not transmitted successfully when the corresponding remaining transmission time becomes zero, then the first node discards the data packet.

10. The method according to claim 1, wherein when any accessible slot arrives, if it is determined that there is currently no data packet to be transmitted, then the first node invalidates the accessible slot, wherein if the accessible slot is a requested slot, then the first node deletes the requested slot from a locally maintained list of requested slots, and if the accessible slot is an occupied slot, then the first node deletes the occupied slot from a locally maintained list of occupied slots.

11. A device for scheduling slot resources, comprising a memory and a processor, wherein the memory is configured to store instructions of a computer program and the processor is configured to execute the computer program to:
  upon reception of each new data packet transmitted by a higher layer, store the new data packet and maintain a remaining transmission time of the new data packet according to a transmission delay corresponding to the new data packet; and
  make a judgement on slot resource sequentially for each stored data packet with the remaining transmission time more than or equal to the remaining transmission time of the new data packet in an ascending order of the remaining transmission time starting with the new data packet, request a new slot resource when it is determined that the number of data packets to be transmitted is more than the number of slots currently used by the device in the remaining transmission time corresponding to any data packet;
  wherein the processor configured to execute the computer program to request the new slot resource when it is determined that the number of data packets to be transmitted is more than the number of slots currently used by the device in the remaining transmission time corresponding to the any data packet while making a judgement on slot resource for any data packet is configured:
  to judge from locally maintained slot state information whether there are idle slots in the system before the remaining transmission time corresponding to the data packet, for which a judgement on slot resource is made, expires; and
  if so, to select one of the idle slots as a newly requested slot;
  otherwise, to discard the data packet for which the judgement on slot resource is made, and to stop making a judgement on slot resource for a subsequent data packet; or
  to reserve the data packet for which the judgement on slot resource is made, to terminate a slot requesting process for the data packet for which the judgement on slot resource is made, and to continue making a judgement on slot resource for a subsequent data packet; or
  to select a low-priority data packet, with the remaining transmission time less than that of the data packet for which the judgement on slot resource is made and a priority lower than that of the data packet for which the judgement on slot resource is made, from the stored data packets, and to delete the selected low-priority data packet from a buffer; or
  when a delay margin corresponding to the data packet for which the judgement on slot resource is made is set and the delay margin is not 0, to update the remaining transmission time corresponding to the data packet, for which the judgement on slot resource is made, with the length of time indicated by the delay margin, and to select an idle slot in an updated remaining transmission time as a newly requested slot, wherein if there is still no idle slot in the updated remaining time, the data packet, for which the judgement on slot resource is made, is discarded, and no judgement on slot resource is made for a subsequent data packet; or the data packet, for which the judgement on slot resource is made, is reserved, the slot requesting process for the data packet, for which the judgement on slot resource is made, is terminated, and a judgement on slot resource is further made for a subsequent data packet; or a low-priority data packet, with the remaining transmission time less than that of the data packet for which the judgement on slot resource is made and a priority lower than that of the data packet for which the judgement on slot resource is made, is selected from the stored data packets, and the selected low-priority data packet is deleted from a buffer.

12. The device according to claim 11, wherein the processor configured to execute the computer program to, upon reception of each new data packet transmitted by a higher layer, store the new data packet and maintain a remaining transmission time of the new data packet according to a transmission delay corresponding to the new data packet is configured:
  to determine the preset transmission delay corresponding to the new data packet upon reception of the new data packet; and
  to set a timer, associated with the new data packet, for maintaining the remaining transmission time, according to the transmission delay, wherein the remaining transmission time characterizes the length of time starting from current time to the latest transmission time corresponding to the transmission delay of the new data packet.

13. The device according to claim 12, wherein the processor is further configured:
  each time an accessible slot arrives, to select and transmit a data packet currently with the shortest remaining transmission time, wherein if any data packet is not transmitted successfully when the corresponding remaining transmission time becomes zero, then the data packet is discarded.

14. The device according to claim 12, wherein the processor is further configured:
  when any accessible slot arrives, if it is determined that there is currently no data packet to be transmitted, to invalidate the accessible slot, wherein if the accessible slot is a requested slot, then the requested slot is deleted from a locally maintained list of requested slots, and if the accessible slot is an occupied slot, then the occupied slot is deleted from a locally maintained list of occupied slots.

15. The device according to claim 11, wherein the processor configured to execute the computer program to make a judgement on slot resource sequentially for each stored data packet with the remaining transmission time more than or equal to the remaining transmission time of the new data packet in an ascending order of the remaining transmission time starting with the new data packet, request a new slot resource when it is determined that the number of data packets to be transmitted is more than the number of slots currently used by the device in the remaining transmission time corresponding to any data packet is configured:

to sort the stored data packets in an ascending order or a descending order according to the remaining transmission times corresponding thereto, and then to make a judgement on slot resource sequentially for each stored data packet with the remaining transmission time more than or equal to the remaining transmission time of the new data packet in an ascending order of the remaining transmission time, starting with the new data packet, among the respective sorted data packets; or to compare the remaining transmission time of each stored data packet with the remaining transmission time of the new data packet starting with the new data packet, then to pick the data packets with the remaining transmission times more than or equal to the remaining transmission time of the new data packet from the respective stored data packets according to comparison results, and next to make a judgement on slot resource sequentially for each picked data packet in an ascending order of the remaining transmission time.

16. The device according to claim 11, wherein the processor is further configured:

after the newly requested slot is selected from the idle slots, to add the newly requested slot to a list of requested slots, and to update the slot state information corresponding to the newly requested slot.

17. The device according to claim 11, wherein the processor is further configured:

each time an accessible slot arrives, to select and transmit a data packet currently with the shortest remaining transmission time, wherein if any data packet is not transmitted successfully when the corresponding remaining transmission time becomes zero, then the data packet is discarded.

18. The device according to claim 11, wherein the processor is further configured:

when any accessible slot arrives, if it is determined that there is currently no data packet to be transmitted, to invalidate the accessible slot, wherein if the accessible slot is a requested slot, then the requested slot is deleted from a locally maintained list of requested slots, and if the accessible slot is an occupied slot, then the occupied slot is deleted from a locally maintained list of occupied slots.

* * * * *